United States Patent
Deng

(10) Patent No.: US 11,584,209 B2
(45) Date of Patent: Feb. 21, 2023

(54) SMART VEHICLE SUNSHADE WITH STORAGE FUNCTION

(71) Applicant: Guangzhou Wewin Motor Co., Ltd., Guangdong (CN)

(72) Inventor: Shangyun Deng, Guangdong (CN)

(73) Assignee: GUANGZHOU WEWIN MOTOR CO., LTD., Guangdong (CN)

( * ) Notice: Subject to any disclaimer, the term of this patent is extended or adjusted under 35 U.S.C. 154(b) by 115 days.

(21) Appl. No.: 17/165,173

(22) Filed: Feb. 2, 2021

(65) Prior Publication Data

US 2022/0185084 A1 Jun. 16, 2022

(30) Foreign Application Priority Data

Dec. 14, 2020 (CN) .......................... 202011466916.8

(51) Int. Cl.
| | |
|---|---|
| B60J 11/04 | (2006.01) |
| E04H 15/06 | (2006.01) |
| E05F 15/614 | (2015.01) |
| A45B 11/00 | (2006.01) |
| A45B 25/00 | (2006.01) |
| A45B 25/16 | (2006.01) |

(52) U.S. Cl.
CPC .............. *B60J 11/04* (2013.01); *A45B 11/00* (2013.01); *A45B 25/006* (2013.01); *A45B 25/165* (2013.01); *E05F 15/614* (2015.01); *A45B 2200/1027* (2013.01)

(58) Field of Classification Search
CPC .................................. E04H 15/06; B60J 11/04
See application file for complete search history.

(56) References Cited

U.S. PATENT DOCUMENTS

| | | | | | |
|---|---|---|---|---|---|
| 4,562,849 | A | * | 1/1986 | Sirota ................. | A45B 25/143 |
| | | | | | 135/22 |
| 5,529,368 | A | * | 6/1996 | Cui ........................ | B60R 7/12 |
| | | | | | 296/99.1 |

(Continued)

FOREIGN PATENT DOCUMENTS

| | | |
|---|---|---|
| CN | 107212539 A | 9/2017 |
| CN | 111923710 A | 11/2020 |
| WO | WO-2019014961 A1 * 1/2019 | ............. A45B 19/10 |

*Primary Examiner* — Noah Chandler Hawk
(74) *Attorney, Agent, or Firm* — Muncy, Geissler, Olds & Lowe, P.C.

(57) ABSTRACT

The present application discloses a smart vehicle sunshade with storage function, which includes a box body, an umbrella body, a drive mechanism, a wind speed sensor and a controller. The box body includes an umbrella body compartment, a trunk and a sealed compartment. An umbrella body compartment door is arranged on an upper side of the umbrella body compartment. The umbrella body includes an umbrella handle, an umbrella opening mechanism, a folding rib and an umbrella surface arranged outside the folding rib. The drive mechanism includes a connecting spindle, an umbrella rotating mechanism, an umbrella rotating drive mechanism and a swing mechanism. The present application can not only detect the wind speed in real time, automatically close the umbrella body when the wind speed is too high, and can automatically restart by a preset time, which effectively improves the service life of the umbrella body.

9 Claims, 8 Drawing Sheets

(56) References Cited

U.S. PATENT DOCUMENTS

| | | | | |
|---|---|---|---|---|
| 6,213,137 B1* | 4/2001 | Wang | ........................ | B60R 7/12 |
| | | | | 296/99.1 |
| 8,651,555 B2* | 2/2014 | Chan | ........................ | B60J 11/04 |
| | | | | 52/DIG. 14 |
| 8,684,444 B2* | 4/2014 | Dao | ........................ | B60J 11/02 |
| | | | | 296/136.01 |
| 9,352,642 B2* | 5/2016 | Fogarty | .................... | B60J 11/04 |
| 9,815,359 B2* | 11/2017 | Morazan | .................. | B60J 11/04 |
| 9,850,680 B1* | 12/2017 | Yi | .......................... | B60J 5/0494 |
| 2017/0063290 A1* | 3/2017 | Kurlagunda | ............ | B60L 8/003 |

* cited by examiner

SMART VEHICLE SUNSHADE WITH STORAGE FUNCTION

CROSS-REFERENCE TO RELATED APPLICATIONS

This application claims the benefit of Chinese Patent Application No. 202011466916.8, filed on Dec. 14, 2020 in the National Intellectual Property Administration of China, the disclosure of which is incorporated herein by reference in its entirety.

TECHNICAL FIELD

The present application relates to the technical field of sunshade devices, and in particular to a smart vehicle sunshade with storage function.

BACKGROUND

With the increasing use of vehicles, parking in the blazing sun will quickly accumulate heat in the vehicle, causing the temperature in the vehicle to rise rapidly. After a long time, the leather goods or related materials in the vehicle will produce some harmful gases due to being exposed to the blazing sun, which can cause the human body to breathe poorly, resulting in a bad sense of comfort. The vehicle body is easily damaged under the sun. For example, plastic, paint, rubber, etc., will accelerate aging. In addition, it takes a lot of energy to cool down after driving.

For this reason, vehicle sunshades appear recently, which can block the sun from directly irradiating the vehicle body, so as to greatly reduce the temperature in the vehicle. However, the current vehicle sunshades are generally semi-automatic or single-function full-automatic, with low degree of automation, complex structure, and single function. When the umbrella body is opened, if the wind is too strong, the umbrella body will be stressed, and the unfolded umbrella body and ribs may be broken by the wind and cause losses, thereby affecting the service life of the umbrella body. In addition, the existing vehicle sunshade usually only has a compartment for accommodating the umbrella body, which cannot be used for storing items and has low space utilization.

SUMMARY

In order to overcome the shortcomings of the prior art, an object of the present application is to provide a smart vehicle sunshade with storage function, which can not only detect the wind speed in real time, automatically close the umbrella body when the wind speed is too high, and can automatically restart by a preset time, which effectively improves the service life of the umbrella body, and at the same time has the functions of sun-shading and rain-proofing, with a high degree of automation, but also can realize the storage function through the trunks on two sides of the box body, and can supplement power by solar panels, which has strong endurance.

The object of the present application is achieved by adopting the following technical solutions.

A smart vehicle sunshade with storage function includes a box body, an umbrella body, a drive mechanism, a wind speed sensor and a controller. The box body includes an umbrella body compartment, a trunk and a sealed compartment. The umbrella body compartment is arranged in the center of the box body. An umbrella body compartment door is arranged on an upper side of the umbrella body compartment. The umbrella body compartment door is connected to an umbrella body compartment door drive mechanism. The umbrella body compartment door is controlled by the umbrella body compartment door drive mechanism to open or close automatically. A base is arranged on one side of the umbrella body compartment.

The trunk is arranged on either side of a long side of the umbrella body compartment. An independently openable trunk upper cover is arranged on upper sides of the two trunks respectively. The trunk upper cover can be manually opened for placing luggage or storing items without opening the umbrella body compartment door. The two trunks are used to realize the storage function.

The sealed compartment is arranged on either side of a short side of the box body. An end cover is arranged on an upper side of the sealed compartment. The sealed compartment is used to install the umbrella compartment door drive mechanism. One of the end covers or the two end covers are provided with a solar panel for supplementing power.

The umbrella body is arranged in the umbrella body compartment. The umbrella body includes an umbrella handle, an umbrella opening mechanism, a folding rib, and an umbrella surface arranged outside the folding rib.

The drive mechanism is arranged on the base. The drive mechanism includes a connecting spindle, an umbrella rotating mechanism, an umbrella opening drive mechanism, and a swing mechanism. The connecting spindle is detachably connected to the umbrella handle. Further, both the connecting spindle and the umbrella handle are provided with threaded holes. The connecting spindle is connected to the umbrella handle through fastening bolts and threaded holes. When the umbrella body needs to be removed for another use, it can be disassembled by directly unscrewing the fastening bolts, which is convenient to operate. After being disassembled, the umbrella body can be installed on a matching special tripod to be used as a large-area ordinary umbrella.

The umbrella rotating mechanism is used to drive the connecting spindle to rotate in an axial direction, in order to drive the umbrella body to rotate in the axial direction. Further, the umbrella rotating mechanism includes a rotating motor and a first worm gear mechanism. The rotating motor is fixedly arranged on the base. An input of the first worm gear mechanism is connected to the rotating motor, and an output thereof is connected to the connecting spindle. The power of the rotating motor is transmitted to the connecting spindle by changing the direction of a driving force of the rotating motor through the first worm gear mechanism, in order to drive the umbrella body to rotate in the axial direction. When the umbrella body is opened, it can shield sunshine in the direction from the front to the rear of the vehicle. The umbrella body can be rotated to the left and right of the vehicle through the umbrella rotating mechanism to block the rain at the door, which solves the problem that the driver and passengers get wet when getting off the vehicle due to being unable to open an umbrella in time.

The umbrella opening drive mechanism is connected to the umbrella opening mechanism to drive the folding rib to open or fold. Further, the umbrella opening drive mechanism includes an umbrella opening motor and a second worm gear mechanism. The umbrella rotating opening motor is arranged on the base. An input of the second worm gear mechanism is connected to the umbrella rotating opening motor, and an output thereof is connected to the umbrella opening mechanism. The direction of a driving force of the umbrella opening motor is changed by the second worm gear mechanism, in order to drive the folding rib to open or fold.

The swing mechanism is connected to the connecting spindle to drive the connecting spindle to rotate in a radial direction, in order to drive the umbrella body to rotate into or out of the umbrella body compartment. Further, the swing mechanism includes a swing motor and a gear set. The swing motor is arranged on the base, and is connected to one side of the connecting spindle through the gear set to drive the connecting spindle to rotate in the radial direction, in order to drive the umbrella body to rotate into or out of the umbrella body compartment.

The wind speed sensor is arranged on the top of the umbrella body for measuring real-time wind speed. When the umbrella body is rotated out of the umbrella body compartment and is in an open state, the wind speed sensor is located on the top of the umbrella body to detect the magnitude of the ambient wind speed in real time. When it is detected that the wind speed is greater than a set value, the umbrella body is retracted into the umbrella body compartment through the controller, and within 3-30 minutes (the specific time can be customized by a remote controller external to the controller and is set to 5 minutes in this embodiment), an umbrella opening command is re-executed (under the premise that no umbrella closing command is received from a user during the period). After more than five closure actions due to wind speed occur in one hour, the umbrella opening command will no longer be automatically executed, and it needs to be executed only by starting an umbrella opening program through a remote controller or control button external to the controller, which is convenient for a driver to control.

The controller is respectively electrically connected to the umbrella compartment door drive mechanism, the drive mechanism and the wind speed sensor.

In this embodiment, a power supply assembly arranged in the trunk is further included. Further, the power supply assembly is a rechargeable lithium battery. The solar panel is electrically connected to the power supply assembly for supplementing power. The solar panel absorbs solar energy to supplement power for the power supply assembly, which improves the endurance.

In this embodiment, the umbrella opening mechanism includes a screw rod and a screw nut. The screw rod is rotatably arranged in the umbrella handle. A through groove is arranged on a side wall of the umbrella handle. The screw nut is sleeved on the umbrella handle and is matched with the screw rod through the through groove. The screw rod is rotated to drive the screw nut to slide up and down along the umbrella handle. The screw nut is connected to the folding rib to realize the opening or folding of the folding rib. The umbrella opening drive mechanism drives the screw rod to rotate, in order to drive the screw rod to slide up and down along the umbrella handle, which converts rotary motion into linear motion. The folding rib is driven by the screw nut to open or fold.

In this embodiment, the umbrella handle is provided with an umbrella opening detection mechanism. The umbrella opening detection mechanism includes two limiting members and a position sensor. The two limiting members are respectively arranged on an upper limit and a lower limit of the screw nut. The position sensor is correspondingly arranged on the limiting member for detecting the position of the screw nut. The limiting member limits the movement of the screw nut, which can prevent the umbrella body from being damaged due to excessive pressure caused by the excessive operation of the umbrella opening mechanism. At the same time, the position of the screw nut is detected by the position sensor. During the opening of the umbrella, the position sensor at the upper limit detects that the screw nut is moved to the position, it transmits a signal to the controller to stop the umbrella opening drive mechanism, and the closing process is contrary, which effectively increases the service life of the umbrella body.

In this embodiment, the umbrella compartment door drive mechanism includes a first sector gear, an ejector and a first motor. Two first sector gears are rotatably arranged in the sealed compartment on the side close to the umbrella body compartment door. The two first sector gears mesh with each other. One end of the ejector is connected to the sector gear, and the other end is hinged with one end of the umbrella body compartment door. The first motor is arranged on the other side of the sealed compartment, and is connected to one of the first sector gears to drive the first sector gear to rotate so that the ejector drives the umbrella body compartment door to open or close. The user initiates the umbrella opening program through the controller. The controller first controls the umbrella body compartment door drive mechanism to start the steps of opening the umbrella body compartment door to realize automatic opening or closing.

In order to reduce the gap between the umbrella body compartment door and the trunk upper cover while preventing the problem of interference with the trunk upper cover when the umbrella body compartment door is opened, an anti-interference mechanism arranged in the sealed compartment on the side close to the umbrella body compartment door is further included. The anti-interference mechanism includes an electromagnet, a connecting rod and a lever. Further, the electromagnet is a pull-down electromagnet. The electromagnet is connected to one end of the connecting rod. The other end of the connecting rod is hinged with the lever. A middle of the lever is hinged on a side wall of the sealed compartment. The electromagnet pulls the connecting rod, so that the lever pushes the umbrella body compartment door up. When the controller runs a program of opening the umbrella body compartment door, it first controls the anti-interference mechanism to activate, controls the electromagnet to be attracted for three seconds, pulls down the connecting rod, and pulls one end of the lever through the pull rod, so that the other end of the lever is tilted to lift the umbrella body compartment door by 30 mm, and then runs a program of opening the umbrella body compartment door. That is, the problem of interference with the trunk upper cover when the umbrella body compartment door is opened will not occur.

In this embodiment, a trunk upper cover drive mechanism is arranged in the sealed compartment on the side close to the trunk upper cover. The trunk upper cover drive mechanism includes a second sector gear, a pull rod and a second motor. The second sector gear is rotatably arranged on one side of the sealed compartment. One end of the pull rod is hinged with the second sector gear, and the other end is hinged with the trunk upper cover. The second motor is arranged on the other side of the sealed compartment. The second motor is connected to the second sector gear. The second motor drives the second sector gear to rotate so that the pull rod pulls the trunk upper cover to open or close. Under the premise that the umbrella body compartment door is closed, the user can control the trunk upper cover drive mechanism through the controller to drive the trunk upper cover to be automatically opened, so that luggage can be placed or items can be stored in the trunk, which is more convenient to use and improves the degree of automation. At the same time, the trunk upper cover can also be opened manually.

In this embodiment, a first drainage mechanism and a second drainage mechanism are further included. The first drainage mechanism includes a first drainage groove and a drainage pipe. The first drainage groove is provided below a gap between the umbrella body compartment door and the trunk upper cover. One end of the drainage pipe is connected to the first drainage groove, and the other end penetrates the bottom of the box body. The second drainage mechanism includes a rubber member and a second drainage groove. Two rubber members are respectively disposed on two sides of the gaps between the umbrella body compartment door and the end cover, and between the trunk upper cover and the end cover. The second drainage groove is formed between the two rubber members. Two ends of the second drainage groove respectively lead to bottom edges of the box body. The first drainage mechanism and the second drainage mechanism discharge rainwater falling into the gap between the umbrella body compartment door, the trunk upper cover and the end cover in time to prevent water from entering the box body to damage the internal structure, which has a strong waterproof performance.

In this embodiment, a GPS module is provided in the sealed compartment. The GPS module is electrically connected to the controller for detecting the running or stopping state of the vehicle. When the GPS module detects that the vehicle is moving, the controller automatically locks the degree of umbrella opening. First, the controller can be prevented from be triggered due to misoperation to start the umbrella opening program during the driving process. Second, when the vehicle is started but the umbrella is forgotten to be closed, the controller can automatically start the umbrella closing program, which has a higher degree of safety and automation.

In this embodiment, an umbrella rotating detection mechanism is also included. The umbrella rotating detection mechanism includes a retaining ring and an inductive sensor. The retaining ring is sleeved on the connecting spindle and can follow the connecting spindle to rotate. A protrusion is provided on a side wall of the retaining ring. Two inductive sensors are arranged on one side of the connecting spindle at intervals. The protrusion shields the inductive sensor during rotation in order to obtain a rotation angle of the umbrella body, which improves the accuracy of the controller to control the umbrella rotating mechanism and achieves more precise control.

Compared with the prior art, the present application has the following beneficial effects.

(1) A wind speed sensor is arranged on the top of the umbrella body. When the umbrella body is rotated out of the umbrella body compartment and is in an open state, the wind speed sensor is located on the top of the umbrella body to detect the magnitude of the ambient wind speed in real time. When it is detected that the wind speed is greater than a set value, the umbrella body is retracted into the umbrella body compartment through the controller, which prevents damage to the umbrella body by strong winds and effectively increases the service life of the umbrella body. After a preset time, the umbrella body can be automatically restarted. The restart time can be set in the range of 3-30 minutes. Within one hour after any first closing action due to excessive wind speed, if there are 5 consecutive closing actions, the umbrella body will stop reopening automatically. If it needs to reopened, the umbrella body needs to be opened with a remote controller or a button on the box.

(2) A swing mechanism, an umbrella opening drive mechanism and an umbrella rotating mechanism are provided. Actions of rotating the umbrella body into or out of the umbrella body compartment, opening or closing the umbrella body, and rotating the umbrella body can be realized through the automatic control of the controller, so as to achieve sun-shading and rain-proofing function, which has a high degree of automation.

(3) Trunks are arranged on two sides of the umbrella body compartment, and the storage space provided by the trunks can realize the storage function of the ordinary roof trunk, which improves the space utilization rate.

(4) Solar panels are installed to charge the power supply components.

The present application can not only detect the wind speed in real time, automatically close the umbrella body when the wind speed is too high, and automatically restart the umbrella body after a preset time, effectively improving the service life of the umbrella body, and has the functions of sun-shading and rain-proofing, having a high degree of automation. The trunks on two sides of the box boy can realize the storage function, and can also supplement electricity through solar panels, which has strong endurance.

In the figures: 1. box body; 11. umbrella body compartment; 111. umbrella body compartment door; 12. trunk; 121. trunk upper cover; 122. power supply assembly; solar panel; 132. GPS module; 2. umbrella body; 21. umbrella handle; 22. umbrella opening mechanism; 221. screw rod; 222. screw nut; 23. folding rib; 24. umbrella opening detection mechanism; 241. Limiting member; 242. position sensor; 25. umbrella surface; 3. drive mechanism; 31. connecting spindle; 32. umbrella rotating mechanism; 33. umbrella opening drive mechanism; 34. swing mechanism; 35. umbrella rotating detection mechanism; 351. retaining ring; 3511. protrusion; 352. inductive sensor; 4. wind speed sensor; 5. base; 6. first drainage mechanism; 61. first drainage groove; 62. drainage pipe; 7. second drainage mechanism; 71. rubber member; 72. second drainage groove; 8. umbrella compartment door drive mechanism; 81. first sector gear; 82. ejector; 83. first motor; 9. anti-interference mechanism; 91. electromagnet; 92. connecting rod; 93. lever; 10. trunk upper cover drive mechanism; 101. second sector gear; 102. pull rod; and 103. second motor.

DESCRIPTION OF EMBODIMENTS

In the following, the present application will be further described in conjunction with the drawings and specific implementations. It should be noted that, provided that there is no conflict, the following embodiments or technical features can be combined to form new embodiments.

Figure 1:
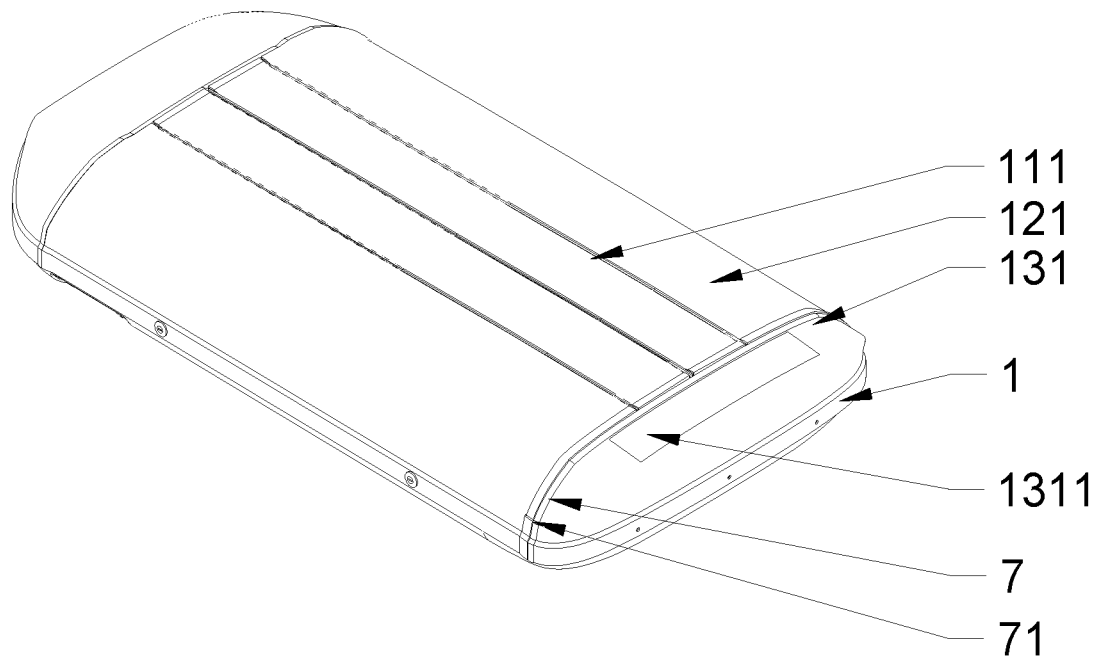
FIG. 1 is a schematic diagram of an unopened state according to an embodiment of the present application.
Figure 2:
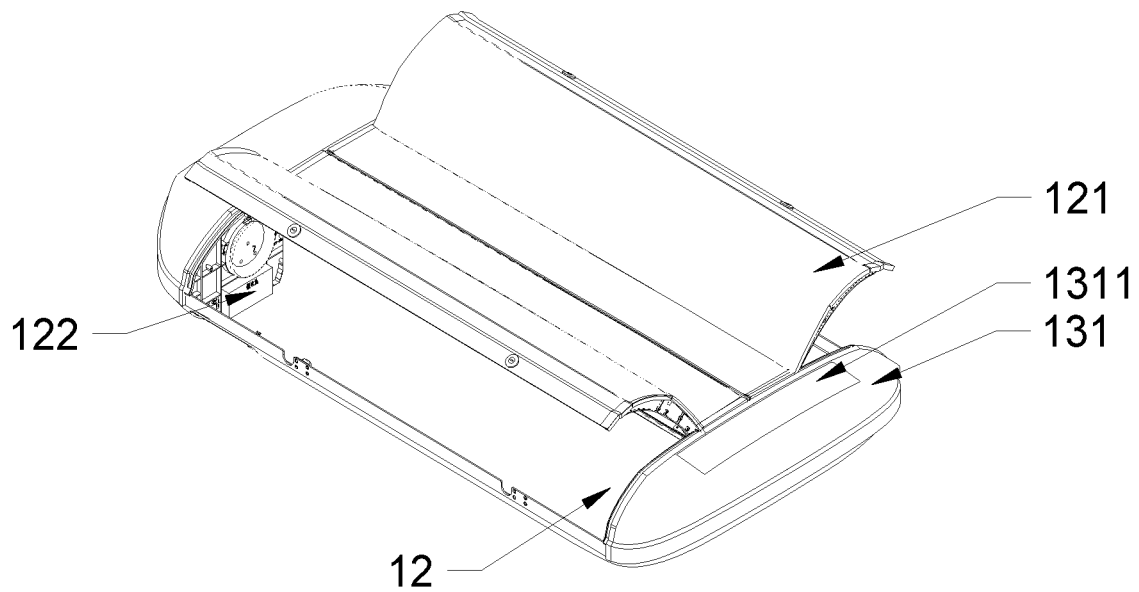
FIG. 2 is a schematic diagram of a state of opening a trunk according to the embodiment of the present application.
Figure 3:
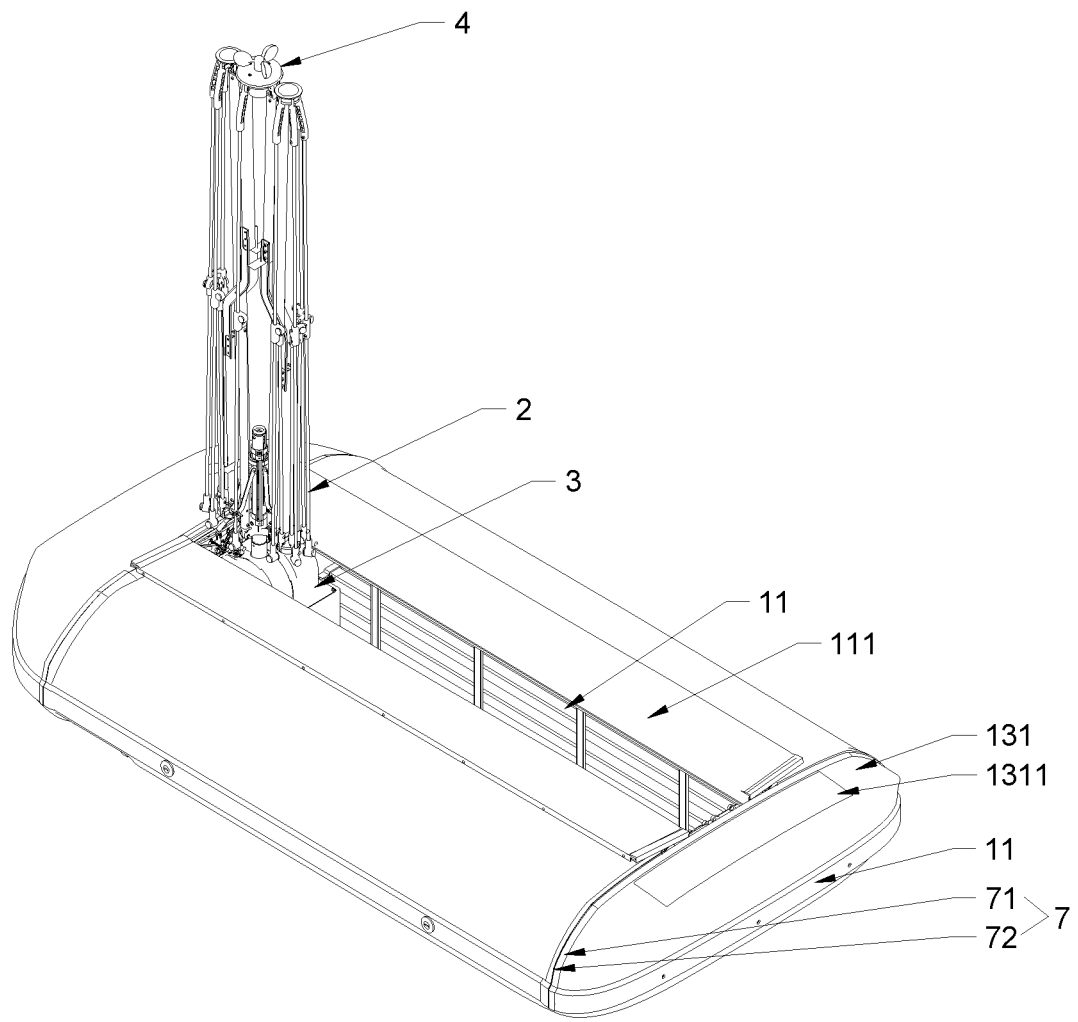
FIG. 3 is a schematic diagram of a state in which an umbrella body is erected according to an embodiment of the present application.
Figure 4:
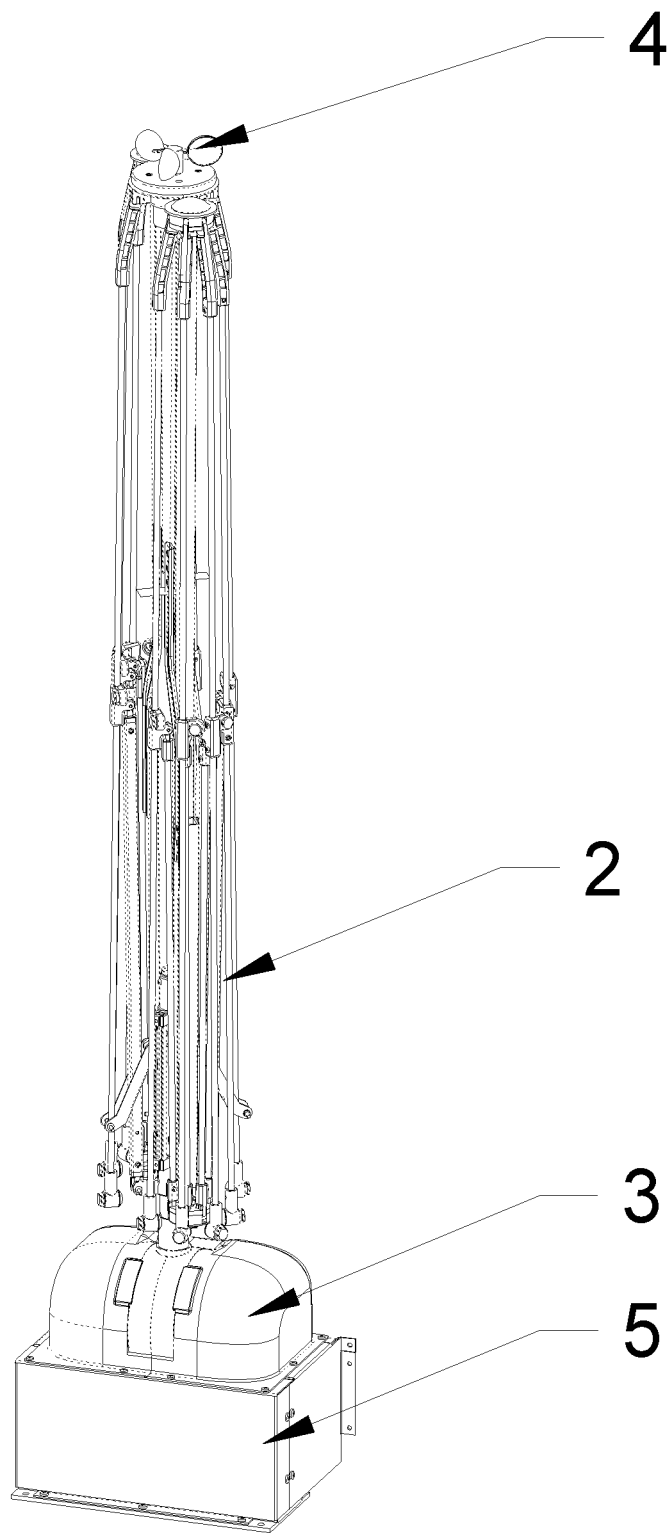
FIG. 4 is a schematic diagram of a connection between the umbrella body and a drive mechanism according to an embodiment of the present application.
Figure 5:
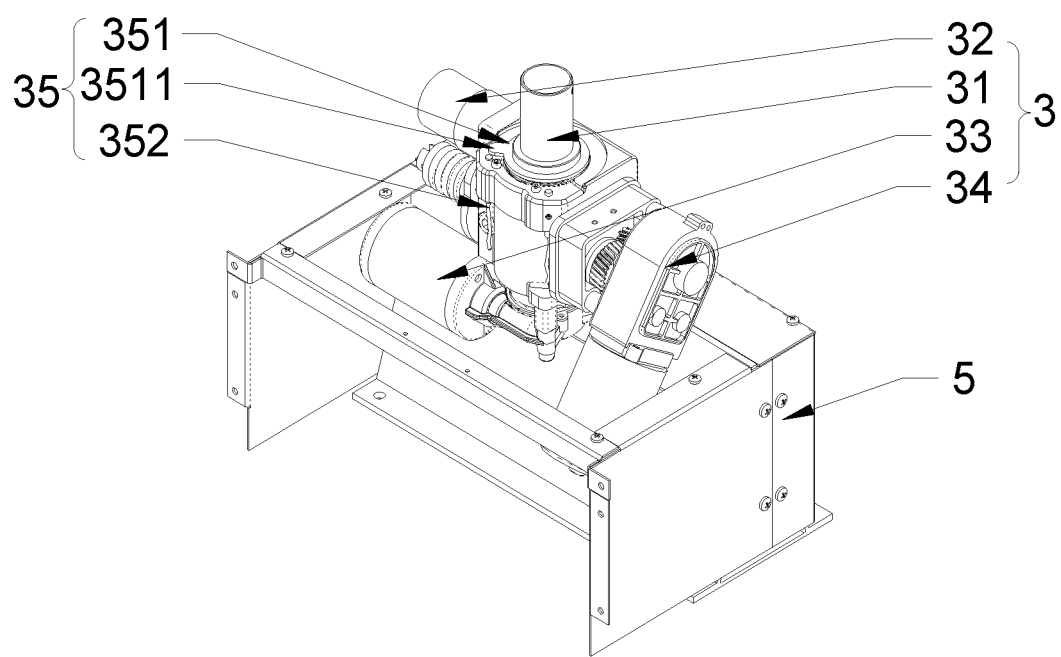
FIG. 5 is a schematic diagram of an internal structure of the drive mechanism according to an embodiment of the present application.
Figure 6:
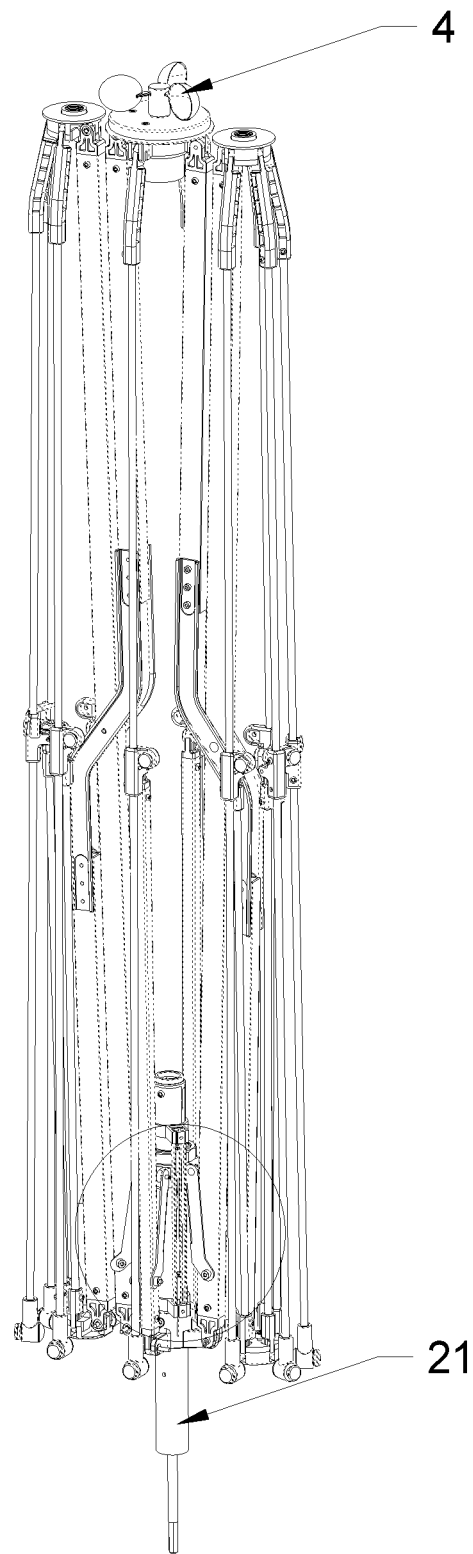
FIG. 6 is a schematic structural diagram of the umbrella body according to an embodiment of the present application.
Figure 7:
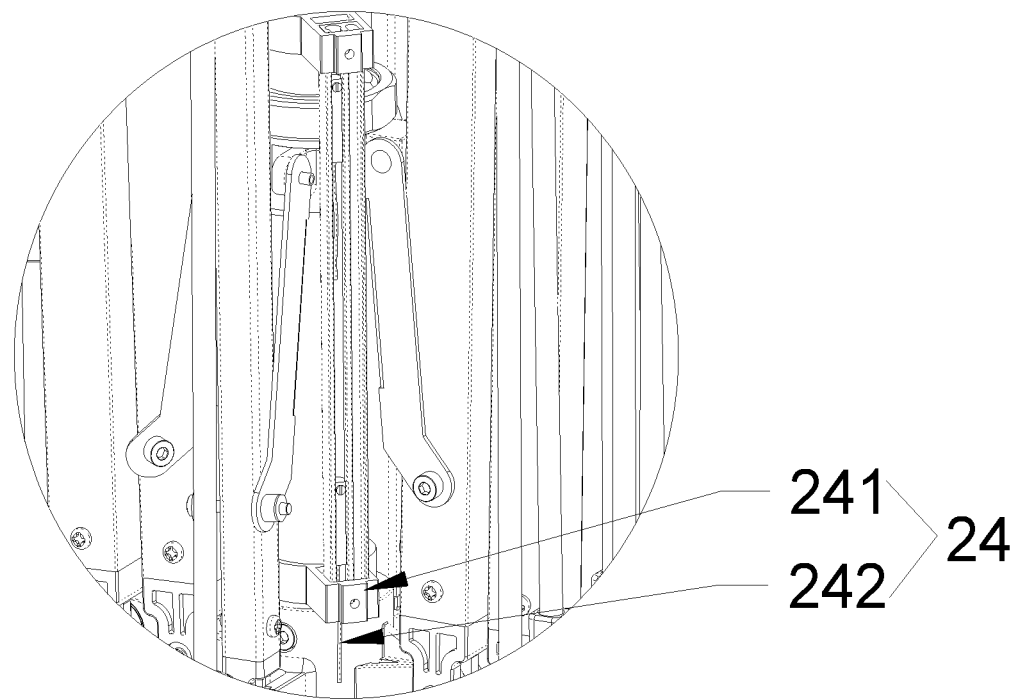
FIG. 7 is a schematic structural diagram of an umbrella opening detection mechanism in FIG. 6 of the embodiment of the present application.
Figure 8:
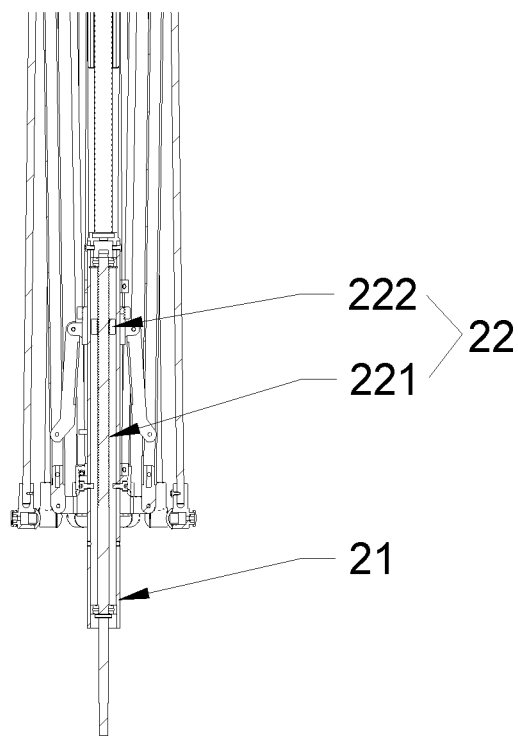
FIG. 8 is a cross-sectional view of an umbrella opening mechanism in FIG. 6 according to an embodiment of the present application.
Figure 9:
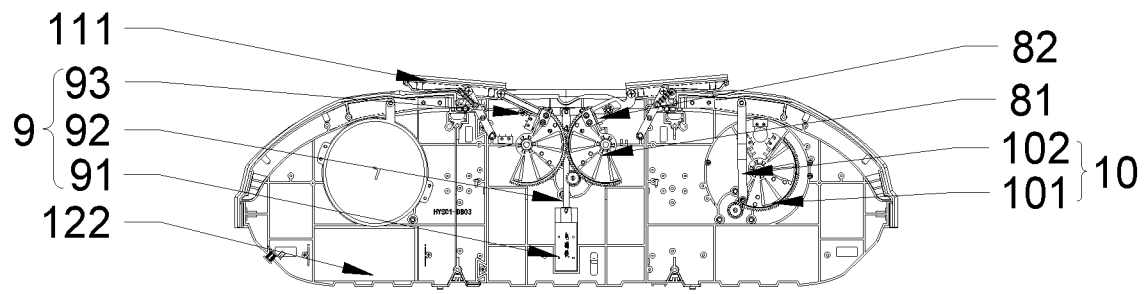
FIG. 9 is a cross-sectional view of a sealed compartment according to an embodiment of the present application from the inside to the outside.
Figure 10:
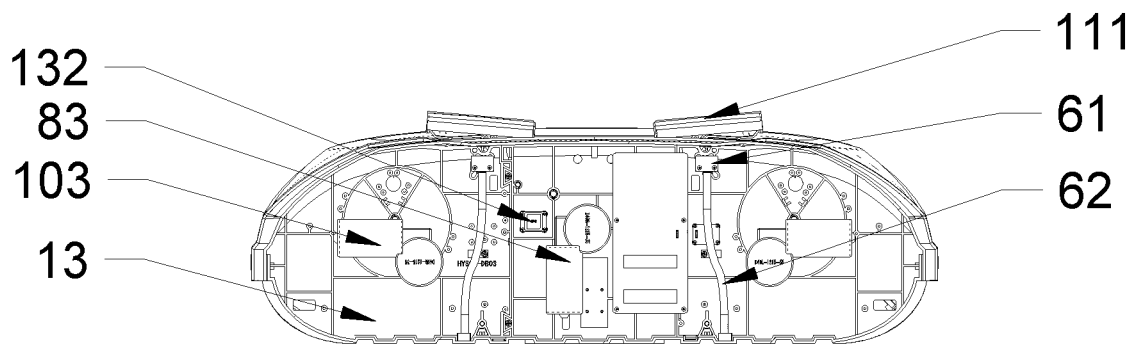
FIG. 10 is a cross-sectional view of the sealed compartment according to an embodiment of the present application from the outside to the inside.
Figure 11:
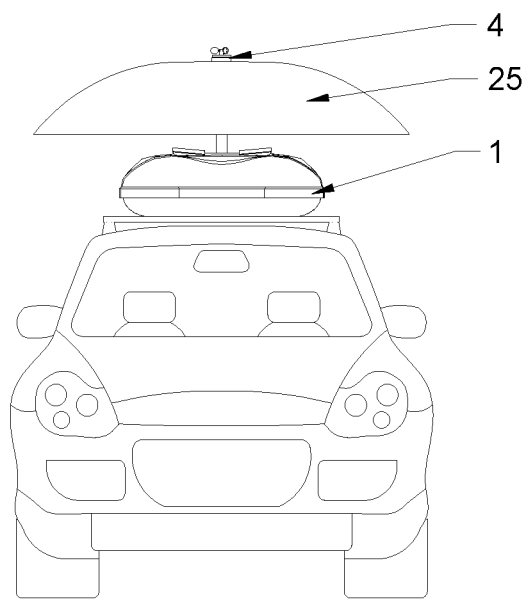
FIG. 11 is a front view of a sunshade mode according to an embodiment of the present application.
Figure 12:
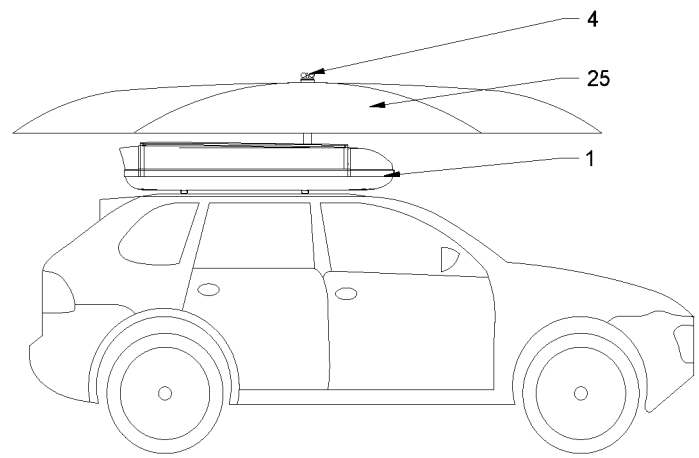
FIG. 12 is a side view of the sunshade mode according to an embodiment of the present application.
Figure 13:
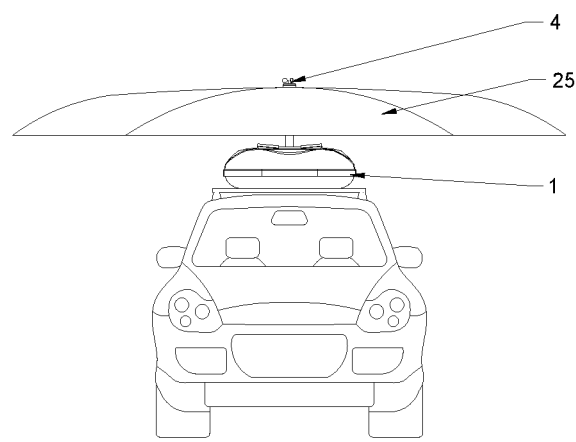
FIG. 13 is a front view of a rainproof mode according to an embodiment of the present application.
Figure 14:
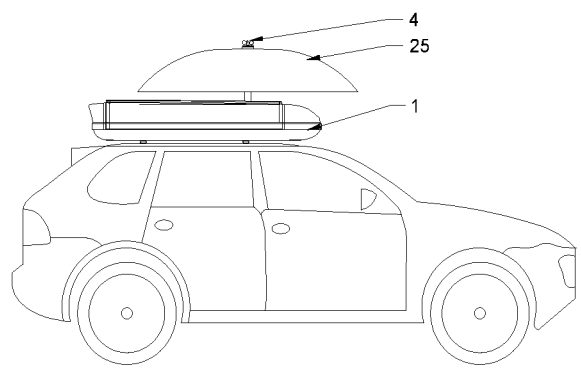
FIG. 14 is a side view of the rainproof mode according to an embodiment of the present application.

As shown in FIGS. 1-14, a smart vehicle sunshade with storage function includes a box body 1, an umbrella body 2, a drive mechanism 3, a wind speed sensor 4 and a controller. The box body 1 includes an umbrella body compartment 11, a trunk 12 and a sealed compartment 13. The umbrella body compartment 11 is arranged in the center of the box body 1. An umbrella body compartment door 111 is arranged on an upper side of the umbrella body compartment 11. The umbrella body compartment door 111 is connected to an umbrella body compartment door drive mechanism 8. The umbrella body compartment door 111 is controlled by the umbrella body compartment door drive mechanism 8 to open or close automatically. A base 5 is arranged on one side of the umbrella body compartment 11.

The trunk 12 is arranged on either side of a long side of the umbrella body compartment 11. An independently openable trunk upper cover 121 is arranged on upper sides of the two trunks 12 respectively. The trunk upper cover 121 can be manually opened for placing luggage or storing items without opening the umbrella body compartment door 111. The two trunks 12 are used to realize the storage function.

The sealed compartment 13 is arranged on either side of a short side of the box body 1. An end cover 131 is arranged on an upper side of the sealed compartment 13. The sealed compartment 13 is used to install the umbrella compartment door drive mechanism 8. One of the end covers 131 or the two end covers 131 are provided with a solar panel 1311 for supplementing power.

The umbrella body 2 is arranged in the umbrella body compartment 11. The umbrella body 2 includes an umbrella handle 21, an umbrella opening mechanism 22, a folding rib 23, and an umbrella surface 25 arranged outside the folding rib 23.

The drive mechanism 3 is arranged on the base 5. The drive mechanism 3 includes a connecting spindle 31, an umbrella rotating mechanism 32, an umbrella opening drive mechanism 33, and a swing mechanism 34. The connecting spindle 31 is detachably connected to the umbrella handle 21. Further, both the connecting spindle 31 and the umbrella handle 21 are provided with threaded holes. The connecting spindle 31 is connected to the umbrella handle 21 through fastening bolts and threaded holes. When the umbrella body 2 needs to be removed for another use, it can be disassembled by directly unscrewing the fastening bolts, which is convenient to operate. After being disassembled, the umbrella body 2 can be installed on a matching special tripod to be used as a large-area ordinary umbrella.

The umbrella rotating mechanism 32 is used to drive the connecting spindle 31 to rotate in an axial direction, in order to drive the umbrella body 2 to rotate in the axial direction. Further, the umbrella rotating mechanism 32 includes a rotating motor and a first worm gear mechanism. The rotating motor is fixedly arranged on the base 5. An input of the first worm gear mechanism is connected to the rotating motor, and an output thereof is connected to the connecting spindle 31. The power of the rotating motor is transmitted to the connecting spindle 31 by changing the direction of a driving force of the rotating motor through the first worm gear mechanism, in order to drive the umbrella body 2 to rotate in the axial direction.

The umbrella opening drive mechanism 33 is connected to the umbrella opening mechanism 22 to drive the folding rib 23 to open or fold. Further, the umbrella opening drive mechanism 33 includes an umbrella opening motor and a second worm gear mechanism. The umbrella rotating opening motor is arranged on the base 5. An input of the second worm gear mechanism is connected to the umbrella rotating opening motor, and an output thereof is connected to the umbrella opening mechanism 22. The direction of a driving force of the umbrella opening motor is changed by the second worm gear mechanism, in order to drive the folding rib 23 to open or fold.

The swing mechanism 34 is connected to the connecting spindle 31 to drive the connecting spindle 31 to rotate in a radial direction, in order to drive the umbrella body 2 to rotate into or out of the umbrella body compartment 11. Further, the swing mechanism 34 includes a swing motor and a gear set. The swing motor is arranged on the base 5, and is connected to one side of the connecting spindle 31 through the gear set to drive the connecting spindle 31 to rotate in the radial direction, in order to drive the umbrella body 2 to rotate into or out of the umbrella body compartment 11.

The wind speed sensor 4 is arranged on the top of the umbrella body 2 for measuring real-time wind speed. When the umbrella body 2 is rotated out of the umbrella body compartment 11 and is in an open state, the wind speed sensor 4 is located on the top of the umbrella body 2 to detect the magnitude of the ambient wind speed in real time. When it is detected that the wind speed is greater than a set value, the umbrella body 2 is retracted into the umbrella body compartment 11 through the controller, and within 3-30 minutes (the specific time can be customized by a remote controller external to the controller and is set to 5 minutes in this embodiment), an umbrella opening command is re-executed (under the premise that no umbrella closing command is received from a user during the period). After more than five closure actions due to wind speed occur in one hour, the umbrella opening command will no longer be automatically executed, and it needs to be executed only by starting an umbrella opening program through a remote controller or control button external to the controller, which is convenient for a driver to control.

The controller is respectively electrically connected to the umbrella compartment door drive mechanism 8, the drive mechanism 3 and the wind speed sensor 4. The controller may be connected to a remote controller or a control button (the control button is arranged on a side wall of the box body).

In this embodiment, a power supply assembly 122 arranged in the trunk 12 is further included. Further, the power supply assembly 122 is a rechargeable lithium battery. The solar panel 1311 is electrically connected to the power supply assembly 122 for supplementing power. The solar panel 1311 absorbs solar energy to supplement power for the power supply assembly 122, which improves the endurance.

In this embodiment, the umbrella opening mechanism 22 includes a screw rod 221 and a screw nut 222. The screw rod 221 is rotatably arranged in the umbrella handle 21. A through groove is arranged on a side wall of the umbrella handle 21. The screw nut 222 is sleeved on the umbrella handle 21 and is matched with the screw rod 221 through the through groove. The screw rod 221 is rotated to drive the screw nut 222 to slide up and down along the umbrella handle 21. The screw nut 222 is connected to the folding rib 23 to realize the opening or folding of the folding rib 23. The umbrella opening drive mechanism 33 drives the screw rod 221 to rotate, in order to drive the screw rod 221 to slide up and down along the umbrella handle 21, which converts rotary motion into linear motion. The folding rib 23 is driven by the screw nut 222 to open or fold.

In this embodiment, the umbrella handle 21 is provided with an umbrella opening detection mechanism 24. The umbrella opening detection mechanism 24 includes two limiting members 241 and a position sensor 242. The two limiting members 241 are respectively arranged on an upper limit and a lower limit of the screw nut 222. The position sensor 242 is correspondingly arranged on the limiting member 241 for detecting the position of the screw nut 222. The limiting member 241 limits the movement of the screw nut 222, which can prevent the umbrella body 2 from being damaged due to excessive pressure caused by the excessive operation of the umbrella opening mechanism 22. At the same time, the position of the screw nut 222 is detected by the position sensor 242. During the opening of the umbrella, the position sensor 242 at the upper limit detects that the screw nut 222 is moved to the position, it transmits a signal to the controller to stop the umbrella opening drive mechanism 33, and the closing process is contrary, which effectively increases the service life of the umbrella body 2.

In this embodiment, the umbrella compartment door drive mechanism 8 includes a first sector gear 81, an ejector 82 and a first motor 83. Two first sector gears 81 are rotatably arranged in the sealed compartment 13 on the side close to the umbrella body compartment door 111. The two first sector gears 81 mesh with each other. One end of the ejector 82 is connected to the sector gear, and the other end is hinged with one end of the umbrella body compartment door 111. The first motor 83 is arranged on the other side of the sealed compartment 13, and is connected to one of the first sector gears 81 to drive the first sector gear 81 to rotate so that the ejector 82 drives the umbrella body compartment door 111 to open or close. The user initiates the umbrella opening program through the controller. The controller first controls the umbrella body compartment door drive mechanism 8 to start the steps of opening the umbrella body compartment door 111 to realize automatic opening or closing.

In order to reduce the gap between the umbrella body compartment door 111 and the trunk upper cover 121 while preventing the problem of interference with the trunk upper cover 121 when the umbrella body compartment door 111 is opened, an anti-interference mechanism 9 arranged in the sealed compartment 13 on the side close to the umbrella body compartment door 111 is further included. The anti-interference mechanism 9 includes an electromagnet 91, a connecting rod 92 and a lever 93. Further, the electromagnet 91 is a pull-down electromagnet 91. The electromagnet 91 is connected to one end of the connecting rod 92. The other end of the connecting rod 92 is hinged with the lever 93. A middle of the lever 93 is hinged on a side wall of the sealed compartment 13. The electromagnet 91 pulls the connecting rod 92, so that the lever 93 pushes the umbrella body compartment door 111 up. When the controller runs a program of opening the umbrella body compartment door 111, it first controls the anti-interference mechanism 9 to activate, controls the electromagnet 91 to be attracted for three seconds, pulls down the connecting rod 92, and pulls one end of the lever 93 through the pull rod 102, so that the other end of the lever 93 is tilted to lift the umbrella body compartment door 111 by 30 mm, and then runs a program of opening the umbrella body compartment door 111. That is, the problem of interference with the trunk upper cover 121 when the umbrella body compartment door 111 is opened will not occur.

In this embodiment, a trunk upper cover drive mechanism 10 is arranged in the sealed compartment 13 on the side close to the trunk upper cover 121. The trunk upper cover drive mechanism 10 includes a second sector gear 101, a pull rod 102 and a second motor 103. The second sector gear 101 is rotatably arranged on one side of the sealed compartment 13. One end of the pull rod 102 is hinged with the second sector gear 101, and the other end is hinged with the trunk upper cover 121. The second motor 103 is arranged on the other side of the sealed compartment 13. The second motor 103 is connected to the second sector gear 101. The second motor 103 drives the second sector gear 101 to rotate so that the pull rod 102 pulls the trunk upper cover 121 to open or close. Under the premise that the umbrella body compartment door 111 is closed, the user can control the trunk upper cover drive mechanism 10 through the controller to drive the trunk upper cover 121 to be automatically opened, so that luggage can be placed or items can be stored in the trunk 12, which is more convenient to use and improves the degree of automation. At the same time, the trunk upper cover 121 can also be opened manually.

In this embodiment, a first drainage mechanism 6 and a second drainage mechanism 7 are further included. The first drainage mechanism 6 includes a first drainage groove 61 and a drainage pipe 62. The first drainage groove 61 is provided below a gap between the umbrella body compartment door 111 and the trunk upper cover 121. One end of the drainage pipe 62 is connected to the first drainage groove 61, and the other end penetrates the bottom of the box body 1. The second drainage mechanism 7 includes a rubber member 71 and a second drainage groove 72. Two rubber members 71 are respectively disposed on two sides of the gaps between the umbrella body compartment door 111 and the end cover 131, and between the trunk upper cover 121 and the end cover 131. The second drainage groove 72 is formed between the two rubber members 71. Two ends of the second drainage groove 72 respectively lead to bottom edges of the box body 1. The first drainage mechanism 6 and the second drainage mechanism 7 discharge rainwater falling into the gap between the umbrella body compartment door 111, the trunk upper cover 121 and the end cover 131 in time to prevent water from entering the box body 1 to damage the internal structure, which has a strong waterproof performance.

In this embodiment, a GPS module 132 is provided in the sealed compartment 13. The GPS module 132 is electrically connected to the controller for detecting the running or stopping state of the vehicle. When the GPS module 132 detects that the vehicle is moving, the controller automatically locks the degree of umbrella opening. First, the controller can be prevented from be triggered due to misoperation to start the umbrella opening program during the driving process. Second, when the vehicle is started but the umbrella is forgotten to be closed, the controller can automatically start the umbrella closing program, which has a higher degree of safety and automation.

In this embodiment, an umbrella rotating detection mechanism 35 is also included. The umbrella rotating detection mechanism 35 includes a retaining ring 351 and an inductive sensor 352. The retaining ring 351 is sleeved on the connecting spindle 31 and can follow the connecting spindle 31 to rotate. A protrusion 3511 is provided on a side wall of the retaining ring 351. Two inductive sensors 352 are arranged on one side of the connecting spindle 31 at intervals. The protrusion 3511 shields the inductive sensor 352 during rotation in order to obtain a rotation angle of the umbrella body 2, which improves the accuracy of the controller to control the umbrella rotating mechanism 32 and achieves more precise control.

In summary, the present application has four functional modes.

1. In a sunshade mode, a large area of sunshade is provided for the vehicle to prevent the vehicle from being exposed to the sun.

2. In a rainproof mode, a rainproof function is provided for passengers on rainy days to avoid getting wet when getting on and off the vehicle.

3. In a leisure mode, the umbrella body can be removed and installed on a matching tripod to be used as a large leisure sunshade.

4. With a storage function, storage boxes on two sides of the box body can provide more than 200 liters of storage space.

The working process of the present application is as follows.

A user activates the sunshade mode through a remote controller (the remote controller is electrically connected to the controller) or a button (the button is installed on a side wall of the box body and electrically connected to the controller). The controller controls the anti-interference mechanism 9 to start, controls the electromagnetic 91 to act for three seconds, and then pulls the lever 93 to push up one end of the umbrella body compartment door 111 by 30 mm. Then the first motor 83 starts to drive the first sector gear 81, and the umbrella body compartment door 111 is pushed out through the ejector 82 to complete the opening action. Then the rotating motor reverses by 270°, so that the folding rib 23 of the umbrella body 2 changes from a horizontal state to a vertical state in the umbrella body compartment 11. Then the swing motor starts to control the connecting spindle 31 to rotate 270° (i.e., perpendicular to the umbrella body compartment 11), in which case the umbrella body 2 is perpendicular to the umbrella body compartment 11. Finally the umbrella opening motor starts, driving the umbrella opening mechanism 22 to open the folding rib 23 of the umbrella body 2 to complete the umbrella opening action, as shown at the positions in FIGS. 11-12. When the umbrella needs to be retracted, a retracting mode is started, which is contrary to the above process. The only difference lies in that when the umbrella body 2 enters the umbrella body compartment 11, it needs to be rotated forward by 270° through the swing motor, so that the umbrella surface of the umbrella body 2 is rolled into the umbrella body compartment 11 to complete storage, and then an action of closing the umbrella body compartment door 111 is performed.

The user activates the rainproof mode through the remote controller or the button. The umbrella opening process is roughly the same as the umbrella opening process in the above sunshade mode. The only difference lies in that before the umbrella opening action, the umbrella body 2 needs to be driven by a rotating motor to rotate 270°, as shown at the positions in FIGS. 13-14, and then an umbrella opening action is performed. The umbrella retracting action is the same as the umbrella retracting action in the above sunshade mode.

The foregoing embodiments are only preferred embodiments of the present application, and are not intended to limit the scope of protection of the present application. Any insubstantial changes and substitutions made by those skilled in the art on the basis of the present application fall into the scope of protection of the present application.

What is claimed is:

1. A smart vehicle sunshade with storage function, comprising a box body (1), an umbrella body (2), a drive mechanism (3), a wind speed sensor (4) and a controller, characterized in that the box body (1) comprises an umbrella body compartment (11), a trunk (12) and a sealed compartment (13), wherein an umbrella body compartment door (111) is arranged on an upper side of the umbrella body compartment (11), the umbrella body compartment door (111) is connected to an umbrella body compartment door drive mechanism (8), and a base (5) is arranged on one side of the umbrella body compartment (11);

the trunk (12) is arranged on either side of a long side of the umbrella body compartment (11), an independently openable trunk upper cover (121) is arranged on upper sides of the two trunks (12) respectively, and the two trunks (12) are used to realize the storage function;

the sealed compartment (13) is arranged on either side of a short side of the box body (1), an end cover (131) is arranged on an upper side of the sealed compartment (13), the sealed compartment (13) is used to install the umbrella compartment door drive mechanism (8), and one of the end covers (131) or both of the end covers (131) are provided with a solar panel (1311) for supplementing power;

the umbrella body (2) is arranged in the umbrella body compartment (11), and the umbrella body (2) comprises an umbrella handle (21), an umbrella opening mechanism (22), a folding rib (23) and an umbrella surface (25) arranged outside the folding rib (23);

the drive mechanism (3) is arranged on the base (5), and the drive mechanism (3) comprises a connecting spindle (31), an umbrella rotating mechanism (32), an umbrella opening drive mechanism (33) and a swing mechanism (34), wherein the connecting spindle (31) is detachably connected to the umbrella handle (21), and the umbrella rotating mechanism (32) is used to drive the connecting spindle (31) to rotate in an axial direction, in order to drive the umbrella body (2) to rotate in the axial direction; the umbrella opening drive mechanism (33) is connected to the umbrella opening mechanism (22) to drive the folding rib (23) to open or fold; and the swing mechanism (34) is connected to the connecting spindle (31) to drive the connecting spindle (31) to rotate in a radial direction, in order to drive the umbrella body (2) to rotate into or out of the umbrella body compartment (11);

the wind speed sensor (4) is arranged on the top of the umbrella body (2) for measuring real-time wind speed; and the controller is electrically connected to the umbrella compartment door drive mechanism (8), the drive mechanism (3) and the wind speed sensor (4) respectively;

the umbrella body compartment door drive mechanism (8) comprises a first sector gear (81), an ejector (82) and a first motor (83), two first sector gears (81) are rotatably arranged in the sealed compartment (13) on the side close to the umbrella body compartment door (111), and the two first sector gears (81) mesh with each other; one end of the ejector (82) is connected to the first sector gear (81), and the other end is hinged with one end of the umbrella body compartment door (111); and the first motor (83) is arranged on the other side of the sealed compartment (13) and is connected to one of the first sector gears (81) to drive the first sector gear (81) to rotate so that the ejector (82) drives the umbrella body compartment door (111) to open or close.

2. The smart vehicle sunshade with storage function according to claim 1, characterized by further comprising a power supply assembly (122) arranged in the trunk (12), wherein the solar panel (1311) is electrically connected to the power supply assembly (122) for supplementing power.

3. The smart vehicle sunshade with storage function according to claim 1, characterized in that the umbrella opening mechanism (22) comprises a screw rod (221) and a screw nut (222), the screw rod (221) is rotatably arranged in the umbrella handle (21), the screw nut (222) is sleeved on the umbrella handle (21) and is matched with the screw rod (221), the screw rod (221) is rotated to drive the screw nut (222) to slide up and down along the umbrella handle (21), and the screw nut (222) is connected to the folding rib (23) to realize the opening or folding of the folding rib (23).

4. The smart vehicle sunshade with storage function according to claim 3, characterized in that the umbrella handle (21) is provided with an umbrella opening detection mechanism (24), the umbrella opening detection mechanism (24) comprises two limiting members (241) and a position sensor (242), the two limiting members (241) are respectively arranged at an upper limit and a lower limit of the screw nut (222), and the position sensor (242) is correspondingly arranged on the limiting member (241) for detecting the position of the screw nut (222).

5. The smart vehicle sunshade with storage function according to claim 1, characterized by further comprising an anti-interference mechanism (9) arranged in the sealed compartment (13) on the side close to the umbrella body compartment door (111), wherein the anti-interference mechanism (9) comprises an electromagnet (91), a connecting rod (92) and a lever (93), the electromagnet (91) is connected to one end of the connecting rod (92), the other end of the connecting rod (92) is hinged with the lever (93), and a middle of the lever (93) is hinged on a side wall of the sealed compartment (13) to pull the connecting rod (92) through the electromagnet (91) in order to enable the lever (93) to push the umbrella body compartment door (111) up.

6. The smart vehicle sunshade with storage function according to claim 1, characterized in that a trunk upper cover drive mechanism (10) is arranged in the sealed compartment (13) on the side close to the trunk upper cover (121), the trunk upper cover drive mechanism (10) comprises a second sector gear (101), a pull rod (102) and a second motor (103), the second sector gear (101) is rotatably arranged on one side of the sealed compartment (13), one end of the pull rod (102) is hinged with the second sector gear (101), the other end is hinged with the trunk upper cover (121), the second motor (103) is arranged on the other side of the sealed compartment (13), the second motor (103) is connected to the second sector gear (101) to drive the second sector gear (101) to rotate so that the pull rod (102) pulls the trunk upper cover (121) to open or close.

7. The smart vehicle sunshade with storage function according to claim 1, characterized by further comprising a first drainage mechanism (6) and a second drainage mechanism (7), wherein the first drainage mechanism (6) comprises a first drainage groove (61) and a drainage pipe (62), the first drainage groove (61) is arranged below a gap between the umbrella body compartment door (111) and the trunk upper cover (121), one end of the drainage pipe (62) is connected to the first drainage groove (61), and the other end penetrates the bottom of the box body (1); the second drainage mechanism (7) comprises a rubber member (71) and a second drainage groove (72), two rubber members (71) are respectively arranged on two sides of the gaps between the umbrella body compartment door (111) and the end cover (131), and between the trunk upper cover (121) and the end cover (131), the second drainage groove (72) is formed between the two rubber members (71), and two ends of the second drainage groove (72) extend to a side wall of the box body (1) respectively.

8. The smart vehicle sunshade with storage function according to claim 1, characterized in that a GPS module (132) is arranged in the sealed compartment (13), and the GPS module (132) is electrically connected to the controller and used to detect a running or stopping state of a vehicle.

9. The smart vehicle sunshade with storage function according to claim 1, characterized by further comprising an umbrella rotating detection mechanism (35), wherein the umbrella rotating detection mechanism (35) comprises a retaining ring (351) and a inductive sensor (352), the retaining ring (351) is sleeved on the connecting spindle (31) and is capable of following the connecting spindle (31) to rotate, a protrusion (3511) is arranged on a side wall of the retaining ring (351), two inductive sensors (352) are arranged on one side of the connecting spindle (31) at intervals, and the protrusion (3511) shields the inductive sensor (352) during rotation to obtain a rotation angle of the umbrella body (2).

\* \* \* \* \*